Jan. 17, 1961
G. SCARVELIS
2,968,179
STATIC LOAD TESTER
Filed Oct. 21, 1955
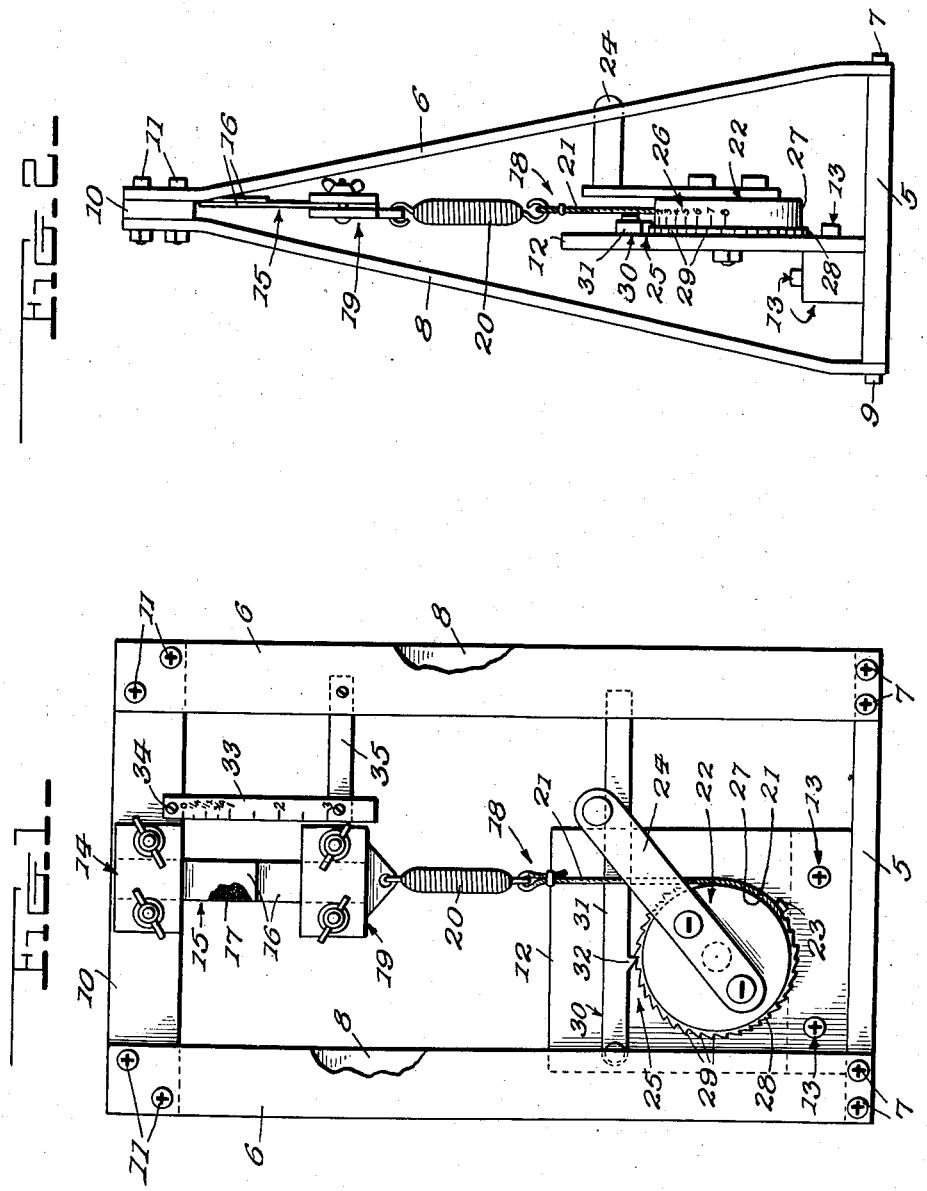
INVENTOR
*Gus Scarvelis*
BY
*Mason, Porter, Diller, Stewart*
ATTORNEYS United States Patent Office 2,968,179
Patented Jan. 17, 1961

2,968,179

STATIC LOAD TESTER

Gus Scarvelis, Mount Vernon, Ohio, assignor to Continental Can Company, Inc., New York, N.Y., a corporation of New York Filed Oct. 21, 1955, Ser. No. 542,020

3 Claims. (Cl. 73—95)

This invention relates to a testing device designed primarily for testing the shear resistance of adhesive seals.

The shear resistance of an adhesive may be tested by using the latter to secure two elements together and then exerting force tending to again separate said elements, and the present invention has for an object the provision of a simple and accurate testing device conveniently usable for this purpose. However, the invention may be employed also for performing a tensile strength test on a test sample whether such sample be of one-piece form or constructed from separate pieces cemented or otherwise secured together.

In the preferred construction, an upright frame is provided having an upper clamp for holding the upper end of a test sample and thus suspending the latter. A lower clamp is provided to engage the lower end of the sample, an elastic pull member depends from this lower clamp, and means is provided on the frame for downwardly pulling upon said pull member to stretch and tension the latter, causing it to exert a testing pull upon the sample. Provision is made for holding this tensioning means, for the elastic pull member, in any position to which it may be moved, and indicating means is provided for showing the pull strength imparted to said pull member by movement of said tensioning means to any position. Thus, after setting the tensioning means at any operative position, the tester may be left unattended if desired, and it will continue to exert a pull of the selected strength upon the sample for any desired period of time. If the sample withstands this pull, the pull member may be further tensioned and a more rigid test performed, and so on until the sample is damaged or ruptured or it is ascertained that it possesses required strength to successfully resist damage or breakage.

One object of the invention has been to embody the tensioning means for the pull member in the form of a manually rotatable wheel for winding the lower end of said pull member to tension the latter, to provide a ratchet and pawl for holding said wheel against retrograde turning, and to provide a scale rotatable with said wheel and cooperable with said pawl to show the strength of the tension imparted to the pull member upon each advancement of said wheel.

Another object has been to provide a tester which could be sufficiently small for convenient use in a small oven or other chamber, permitting the performance of tests at various degrees of temperature, humidity, etc.

Yet another object has been to provide an unusually simple and inexpensive yet an effective and durable construction.

With the above and other objects in view that will hereinafter appear, the nature of the invention will be more clearly understood by reference to the following detailed description, the appended claims and the several views illustrated in the accompanying drawing.

In the drawing:

Figure 1 is a front elevation partly broken away showing the tester in readiness for use.

Figure 2 is an elevation as viewed from the left of Figure 1.

While the construction shown in the drawing will be rather specifically described, it is to be understood that variations may well be made within the scope of the invention.

A horizontal rectangular base plate 5 is provided. Two upstanding front bars 6 are secured at 7 to the front corners of this base plate 5, and two upstanding rear bars 8 are secured at 9 to the rear corners of said base plate. All of the bars 6 and 8 are of uniform length and the front bars 6 converge upwardly with the rear bars 8. A horizontal crown bar 10 has its ends disposed between the upper ends of the front bars 6 and the upper ends of the rear bars 8, and these various bar ends are rigidly bolted together at 11.

For a purpose to appear hereinafter, a vertical bracket plate 12 is secured at 13 to the base plate 5 and projects upwardly therefrom near one end thereof.

The base 5 and the bars 6, 8 and 10 and the bracket plate 12 jointly form a rigid arched frame structure which will withstand all strains to which the device is subjected, with no tendency to spring or sway. The crown bar 10 of this frame carries a suitable clamp 14 for anchoring the upper end of a test sample 15 thereto. For example, this sample is shown as consisting of two overlapped pieces of tape or the like 16 secured together by an adhesive 17.

An elastic pull member is generally denoted at 18, and a suitable clamp 19 is provided for connecting the upper end of said pull member 18 with the suspended sample 15. This pull member preferably comprises a coiled tension spring 20 and a non-stretching cord or cable 21.

A winding wheel 22 is rotatably mounted on the bracket plate 12 for tensioning the pull member 18 to cause it to exert a downward testing pull on the sample 15, the lower end of said pull member 18 being secured at 23 to the periphery of said winding wheel 22. A hand crank 24 is shown for rotating the wheel 22 to wind the lower end of the pull member 15 thereon to a greater or lesser degree, thereby tensioning said pull member as desired; and a ratchet and pawl assembly 25 is employed for holding said wheel 22 against retrograde rotation from any position to which it may be turned. Thus, any desired amount of pull strength may be imparted to the pull member 18 and it will exert such pull force upon the sample 15 to test the latter. The winding wheel 22 is provided with a pull strength scale 26 readable to show the pull strength which has been imparted to the pull member 18 and the consequent test load applied to the sample 15, at any setting of said wheel 22.

The winding wheel 22 is shown of stepped form, with its smaller step 27 engaged with the cord or cable 21 and its larger step 28 provided with the ratchet teeth 29 of the ratchet and pawl assembly 25. The pawl 30 of this assembly is shown as comprising a horizontal lever 31 pivotally mounted on the bracket plate 12 at one side thereof as shown at the left in Figure 1 and overlying the step 28 and having a tooth 32 engageable with the teeth 29.

The scale 26 is shown on the periphery of the step 27 and is preferably calibrated in units of weight, preferably pounds, and the calibration may be accomplished in any suitable manner. The unit divisions of this scale 26 are so related to the ratchet teeth 29 that the pawl tooth 32 constitutes a pointer coacting with said scale in showing the pull strength to which the pull member 18 has been tensioned by turning of the winding wheel 22 to any position. Thus, by reading the scale 26 at the pawl tooth 32, the test load applied to the sample 15, at any setting of the wheel 22, may be seen.

In operation, the test sample 15 is clamped to the crown bar 10 and the clamp 19 is clamped to the lower end of the suspended sample. The winding wheel 22 is then turned to tension the pull member 18 as desired and the test load thus applied to the sample is readable on the scale 26 at the pawl tooth 32. The tester may be left in this set position if desired and the effect upon the sample 15 observed later at the expiration of a predetermined period. Then, if examination shows that the sample has withstood the test load, the wheel 22 may be further advanced to apply a greater test load to the sample, and so on until said sample is either damaged or has shown that it will successfully resist damage.

The placing of a test load upon the sample and continuing this same load for a period of time, is particularly advantageous when testing a sample composed of separate pieces secured together by an adhesive, as the amount of creep of the adhesive, if any, during said period and under the selected load may be determined. To show any sample elongation caused by such creeping of the adhesive or otherwise, a vertical scale 33 may be provided. This scale is shown secured at 34 to the crown bar 10 and braced at 35 to one of the corner bars 6 or 8.

From the foregoing, it will be seen that novel provision has been made for attaining the desired ends. However, attention is again invited to the possibility of making variations within the scope of the invention as defined in the appended claims.

I claim:

1. A static load tester comprising a frame including a base, pairs of upwardly converging legs extending upwardly from said base, a crown bar extending between upper ends of said legs, a fixed sample gripping member carried by said crown bar, a ratchet wheel carried by said frame within the general confines of said frame and above said base in alignment with said fixed sample gripping member, a movable work gripping member disposed below said fixed work gripping member and cooperable therewith to tension a sample extending between said work gripping members, means connecting said ratchet wheel to said movable work gripping member, said means including a flexible pull member and a calibrated spring, said ratchet wheel having circumferentially spaced teeth and a pawl cooperating with said teeth to prevent retrograde movement of said ratchet wheel when the desired testing load has been imposed on a test sample, means for indicating the amount of movement of said flexible pull member to generally indicate the amount of the testing load, and means for indicating the degree of creeping of the sample under a maintained predetermined load application.

2. A static load tester comprising a frame including a base, pairs of upwardly converging legs extending upwardly from said base, a crown bar extending between upper ends of said legs, a fixed sample gripping member carried by said crown bar, a ratchet wheel carried by said frame within the general confines of said frame and above said base in alignment with said fixed sample gripping member, a movable work gripping member disposed below said fixed work gripping member and cooperable therewith to tension a sample extending between said work gripping members, means connecting said ratchet wheel to said movable work gripping member, said means including a flexible pull member and a calibrated spring, said ratchet wheel having circumferentially spaced teeth and a pawl cooperating with said teeth to prevent retrograde movement of said ratchet wheel when the desired testing load has been imposed on a test sample, means for indicating the amount of movement of said flexible pull member to generally indicate the amount of the testing load, said load indicating means including a scale extending about the periphery of said ratchet wheel and aligned with said teeth, said pawl being pointed and functioning as a pointer in conjunction with said scale, and means for indicating the degree of creeping of the sample under a maintained predetermined load application.

3. A static load tester comprising a frame including a base, pairs of upwardly converging legs extending upwardly from said base, a crown bar extending between upper ends of said legs, a fixed sample gripping member carried by said crown bar, a ratchet wheel carried by said frame within the general confines of said frame and above said base in alignment with said fixed sample gripping member, a movable work gripping member disposed below said fixed work gripping member and cooperable therewith to tension a sample extending between said work gripping members, means connecting said ratchet wheel to said movable work gripping member, said means including a flexible pull member and a calibrated spring, said ratchet wheel having circumferentially spaced teeth and a pawl cooperating with said teeth to prevent retrograde movement of said ratchet wheel when the desired testing load has been imposed on a test sample, means for indicating the amount of movement of said flexible pull member to generally indicate the amount of the testing load, said load indicating means including a scale extending about the periphery of said ratchet wheel and aligned with said teeth, said pawl being pointed and functioning as a pointer in conjunction with said scale, and means for indicating the degree of creeping of the sample under a maintained predetermined load application, said creep indicating means including a second scale fixed to the upper portion of said frame closely adjacent said movable sample engaging member and a portion of said movable sample engaging member functioning as a pointer in cooperation with said second scale.

References Cited in the file of this patent

UNITED STATES PATENTS

| | | |
|---|---|---|
| 201,802 | Lee | Mar. 26, 1878 |
| 317,752 | Faija | May 12, 1885 |
| 990,302 | Schopper | Apr. 25, 1911 |
| 1,208,065 | Williams | Dec. 12, 1916 |
| 1,753,532 | Reid et al. | Apr. 8, 1930 |
| 2,306,111 | Scott | Dec. 22, 1942 |
| 2,584,282 | Nelson | Feb. 5, 1952 |